Fig. 6

March 29, 1966 J. M. PARAMYTHIOTI 3,242,835
EQUIPMENT SPECIALLY ADAPTED FOR ACTUATING
CONSOLIDATING OR COMPACTING ROLLERS OR
LIKE DEVICES OPERATING ON SLOPING
GROUND SURFACES
Filed Jan. 21, 1963 8 Sheets-Sheet 3

INVENTOR
JEAN MICHEL PARAMYTHIOTI
By Young & Thompson
ATTYS

March 29, 1966  J. M. PARAMYTHIOTI  3,242,835
EQUIPMENT SPECIALLY ADAPTED FOR ACTUATING
CONSOLIDATING OR COMPACTING ROLLERS OR
LIKE DEVICES OPERATING ON SLOPING
GROUND SURFACES Filed Jan. 21, 1963　　　　　　　　　　　　　8 Sheets-Sheet 5

INVENTOR
JEAN MICHEL
PARAMYTHIOTI
BY Young + Thompson
ATTYS.

INVENTOR
JEAN MICHEL PARAMYTHIOTI
BY Young + Thompson
ATTYS.

United States Patent Office 3,242,835
Patented Mar. 29, 1966

3,242,835
EQUIPMENT SPECIALLY ADAPTED FOR ACTUATING CONSOLIDATING OR COMPACTING ROLLERS OR LIKE DEVICES OPERATING ON SLOPING GROUND SURFACES
Jean Michel Paramythioti, Rantigny, France, assignor to Societe Anonyme des Anciens Etablissements Albaret, Rantigny, France, a corporation of France
Filed Jan. 21, 1963, Ser. No. 252,690
Claims priority, application France, Feb. 15, 1962, 888,107
12 Claims. (Cl. 94—50)

The present invention has for its object and equipment specially adapted for actuating consoliding or compacting rollers or like devices operating on sloping ground surfaces, for example banks, embankments or the like.

The modern technique for the construction of canals and other earth works, bounded wholly or in part by inclined surfaces, necessitates the consolidation and even the rolling of the banks or embankments in order to give them a satisfactory resistance to the action of water and bad weather conditions in general.

Now, as soon as the slope of the said banks, or embankments exceeds a certain value (of the order of 15 to 20%), the machines currently used for rolling on substantially horizontal ground (steam or diesel rollers or compactors, self-driven or drawn) are no longer capable of fulfilling their function in a satisfactory manner. In fact, when they are working along the line of the steepest slope, these machines during their upward travel soon reach the limit of adhesion of their driving wheels (if they are self-driven), or of those of the tractor if they are hauled. When they are working parallel to the lines of equal slope (running transversely to the slop), these machines are limited still more severely by lack of stability and a bad transverse distribution of the consolidation forces.

In order to overcome the above difficulties, in operations of this kind, cylinder rollers have been used which are operated, not by a tractor but by a cable actuated from a winch rigidly fixed to any particular machine used for civil engineering work, moving along the top and horizontal portion of the earthwork (the bank top in the case of a canal).

This method of procedure has the following disadvantages:

(1) It generally immobilizes civil engineering equipment (a heavy track-laying tractor or mechanical shovel) having a high value as compared with that of the roller employed and also therefore with respect to the volume of materials consolidated in a given unit of time. The economic efficiency of the operation is low.

(2) The haulage machine, which is generally very bulky, is often liable, especially on canal-construction sites, to hinder the free movement of trucks on the bank top.

(3) The guiding of the compacting roller along its path, and especially its regular slewing after each pass, necessitated by the successive consolidation of laterally-displaced strips, are carried out with very little precision by means of complicated maneuvers of the haulage machine, these maneuvers being all the more uneconomic in that they are repeated very frequently due to the relatively short length of each travel of the roller.

(4) The power economy of each to-and-fro movement is not very satisfactory, since a portion of the power expended in going up hill against gravity is lost during the downward travel in the form of heat by braking the winch.

The present invention is particularly directed to equipment for compacting inclined ground surfaces, which is simple in construction and efficient in operation, has an overall size substantially less than the conventional machines employed up to the present time, and does not offer any of the disadvantages referred to above.

The equipment according to the invention, adapted for the actuation of compacting rollers or similar apparatus operating on sloping surfaces, for example of banks or embankments, of the kind comprising a machine adapted to move along a road on the edge of the inclined ground surface to be consolidated, the said machine comprising a winch adapted to give at least one compacting roller a to-and-fro movement over the said sloping surface, is characterized in that, the roller being suspended from the winch by two parallel cables hooked on each side of the frame of the said roller, means are provided for varying the free length at will, that is to say of the unwound portion, of one of the said cables with respect to the free length of the other cable.

This arrangement makes it possible to direct the compacting roller as the operator may desire, so as to ensure the movement of this compacting roller along a selected trajectory. In this way, by a progressive shift of the trajectory of the compacting roller or rollers, their longitudinal progression is ensured, and in addition, when a number of compacting rollers are employed simultaneously, the arrangement described prevents them coming into collision.

In one form of construction of the equipment according to the invention, this equipment comprises at least one pair of compacting rollers, the two cables of one compacting roller being wound on the winch drum in the opposite direction to that of the winding of the cables of the other compacting roller, one of the compacting rollers being in the upper position when the other associated compacting roller is in the lower position on the slope to be consolidated.

By thus utilizing one roller as a counterweight for the other, this arrangement enables the driving power to be made uniform at a substantially constant and relatively low value, corresponding only to the various losses due to friction, plus the resistance to rolling of the two compacting rollers.

Other particular features and advantages of the present invention will furthermore become apparent from the description which follows below by way of example, reference being made to the accompanying drawings, in which.

Figure 1:
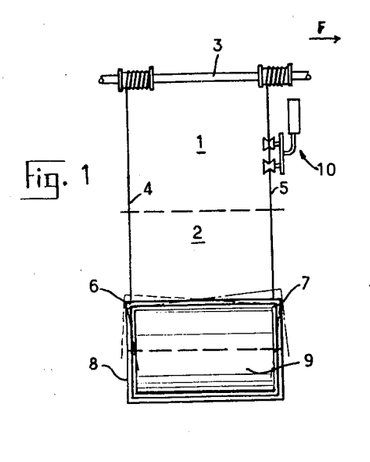
FIG. 1 is a diagrammatic view looking from above of a single compacting roller associated with a winch.

Referring now to FIG. 1, a winch fitted on a driving device adapted to move along the line F over a substantially horizontal path 1 on the edge of a downwardly-sloping surface of ground 2 comprises a drum 3, on which are wound cables 4 and 5 fixed on the side extremities 6 and 7 of a chassis-frame 8 receiving a compacting cylinder 9.

The cable 5 for example is equipped with a device 10 by means of which the useful traction distance between the point 7 and the axis of the drum 3 can be varied.

The device 10 for regulating the free length of a cable can be constructed in various ways.

Figure 2:
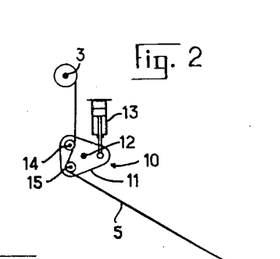
FIGS. 2 and 3 are diagrammatic views of the means for regulating the useful length of a haulage cable on a compacting roller.

In accordance with FIG. 2, the device 10 comprises a plate 11 pivoted about a shaft 12 and having its angular position determined at any moment by means of a jack 13 actuated by the operator. This plate 11 carries two rollers 14 and 15 over which the cable 5 passes before reaching the drum 3 of the winch. By modifying the angular position of the plate 11, it can readily be seen that it is possible to vary the free length of the cable 5 and in consequence the inclination of the chassis-frame 8 and therefore of the cylinder 9, in such manner as to cause the cylinder to follow any desired path.

Figure 3:
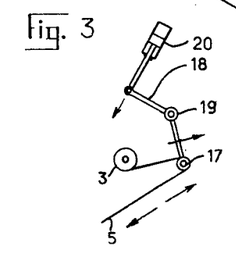

In accordance with the alternative form shown in FIG. 3, this regulating device comprises a pulley 17 over which passes the cable 5, this pulley being maneuverable in a direction substantially parallel to that of the cable 5, through the intermediary of a lever arm 18 pivotally mounted at 19 and subjected to the action of a jack 20 controlled by the operator.

Figure 4:
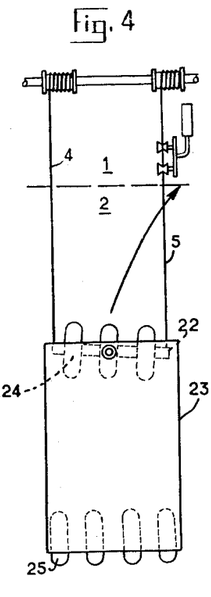
FIG. 4 is a view similar to FIG. 1 of an alternative form of embodiment.

In accordance with FIG. 4, the cables 4 and 5 are fixed to a steering chassis 22 of a compacting roller 23 having two wheel trains 24 and 25, the wheels of the front train 24 being intercalated with respect to the longitudinal axis, between the wheels of the rear train 25. The same regulating effects are obtained as with the arrangement described with reference to FIG. 1.

Figure 5:
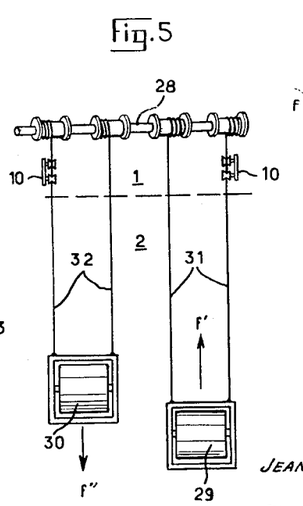
FIG. 5 is a view similar to FIGS. 1 and 4 of a further alternative form of embodiment, with two associated rolling cylinders.

Referring now to FIG. 5, a compacting machine comprises a winch drum 28 associated with two compacting cylinders 29 and 30, the cables 31 of the cylinder 29 and 32 of the cylinder 30 respectively being wound over the drum 28 in opposite directions, so that for a rotation of the winch drum 28 in the direction $f$, the cylinder 29 for example moves up the slope in the direction of the arrow $f'$, while the cylinder 30 moves down along this slope in the direction of the arrow $f''$, the lengths of the cables being previously adjusted in such manner that when the cylinder 29 reaches the upper line of the ground 2 to be consolidated, the cylinder 30 reaches the lower line of this surface 2. In this position, the direction of rotation of the drum is reversed and the cylinder 29 moves downwards while the cylinder 30 moves upwards and so on, a longitudinal shift being of course ensured by the forward movement of the machine along the road 1 and by guiding the compacting cylinders by means of the regulating devices 10.

Figure 6:
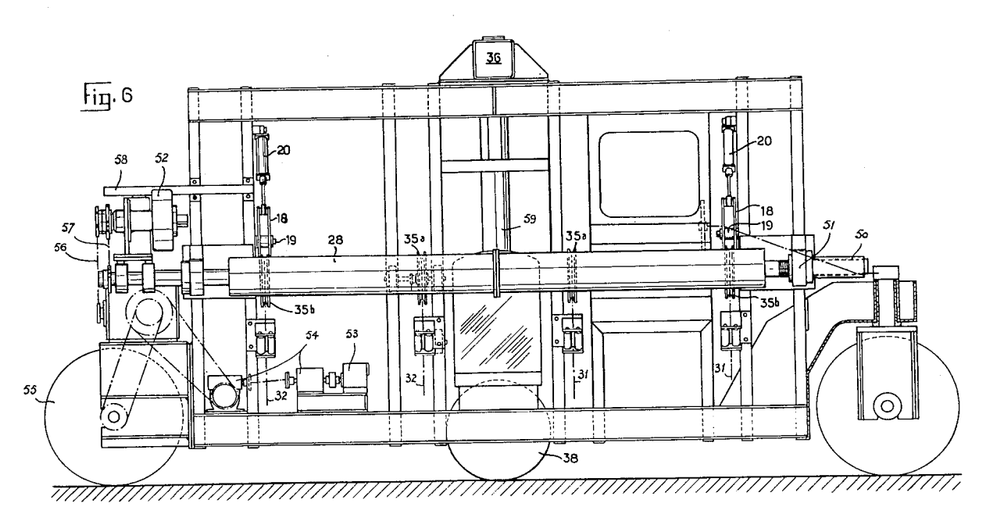
FIG. 6 is a view in elevation of a machine constructed in accordance with the invention.
Figure 7:
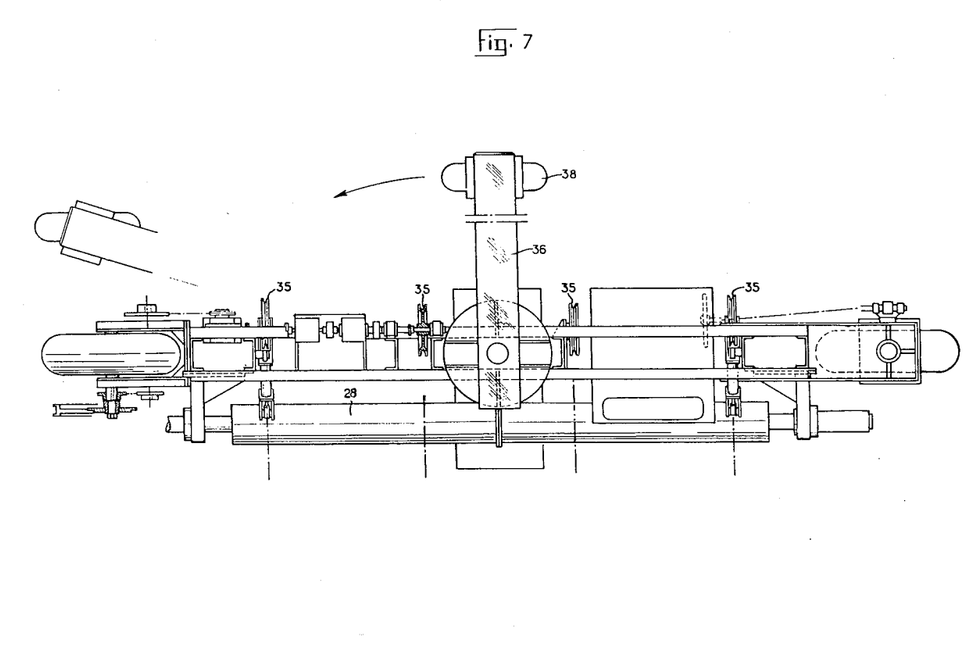
FIG. 7 is a view of this machine looking from above.
Figure 8:
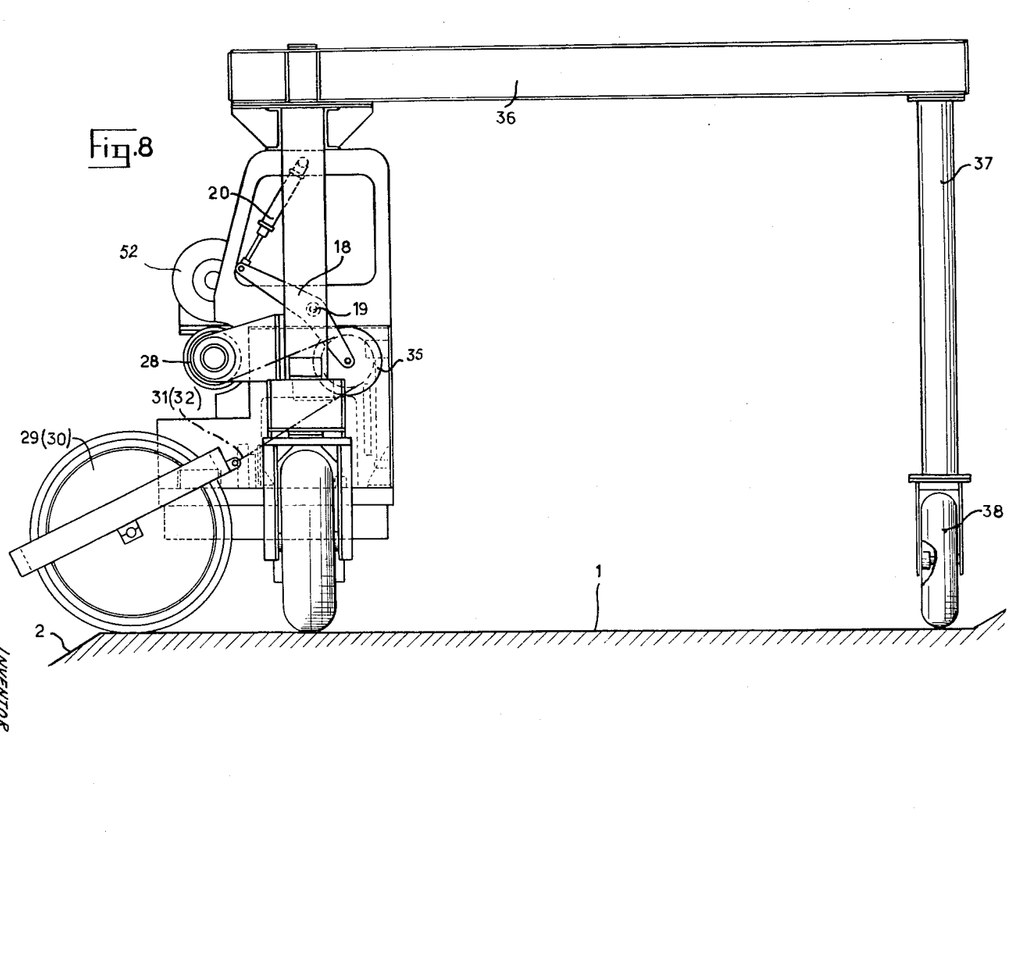
FIG. 8 is a transverse view of the said machine.

In FIGS. 6 to 8 there has been shown a detailed form of construction of equipment intended to be provided with two associated compacting rollers as described with reference to FIG. 5.

There is again seen the drum 28 on which are wound the cables 31 and 32, through the intermediary of pulleys 35, of which some 35a are fixed while others 35b can be displaced in order to regulate the useful length of the cable by using a regulating means of the kind described with reference to FIG. 3, and for which the same references have again been used.

The other particular features of this equipment are as follows:

(1) The winch drum 28 comprises a threaded portion 50 engaged in a bearing nut 51 in order to effect an alternating movement of translation in the axial direction during the winding and the unwinding of the cables 31 and 32 so that the latter can be wound in a helicoidal layer; in this case, the pitch of the thread of the portion 50 is substantially equal to the thickness of the cables employed. In an alternative form, the nut may be rigidly fixed to the drum and the screw fixed to the bearing.

(2) The drive of the drum 28 is effected by any appropriate means capable of ensuring variable winding speeds, and in particular by means of a hydraulic motor 52 of fixed volume, supplied by a variable-delivery pump driven by an internal combustion engine. This motor is rigidly fixed longitudinally to the drum and is prevented from rotating by the guides 58.

The forward movement can be ensured by means of the same internal combustion engine and employing a further variable-delivery hydraulic pump supplying a hydraulic motor 53 of fixed volume, followed by a reduction gear 54 which terminates in a driving wheel 55.

The road movement of the equipment can be effected by means of any appropriate driving means, for example by utilizing the engine 52 acting through a chain 56, while the chain 57 which transmits the driving effort to the winch is put out of service.

It will be noted from FIGS. 7 and 8 that all the essential parts are disposed along a lateral chassis of the machine which further comprises an upper cross-beam 36, resting at its upper extremity on a pillar 37 carried by a wheel 38. The weight of the pillar 37 assists in preventing overturning of the machine produced by the tension of the driving cables of the compacting rollers. Provision may be made for modifying this weight at will by ballast weights.

The whole unit thus forms a kind of gantry, through which trucks and other vehicles using the road 1 may pass. This gantry is pivotally mounted about a vertical shaft 59 in order to reduce the overall size for transport along the road.

Figure 9:
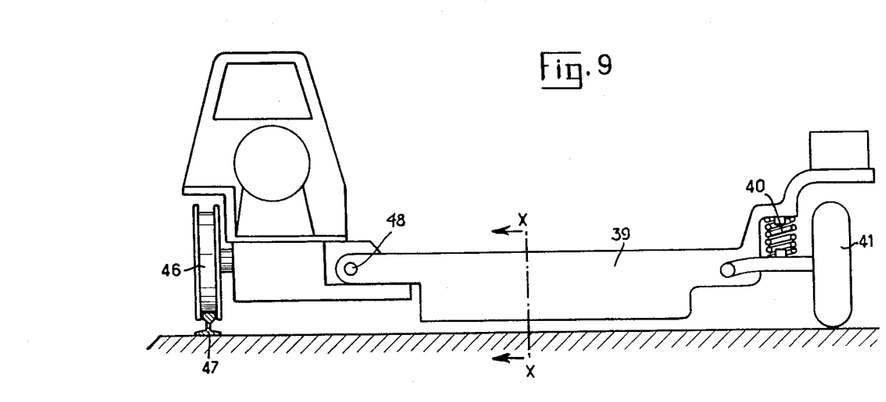
FIG. 9 is a diagrammatic view similar to FIG. 8, of a further alternative form of embodiment of a machine according to the invention.

Instead of providing the machine in the form of a gantry, as shown in FIG. 8, it can be produced as shown in FIG. 9, with a base 39 pivoted at 48 and resting on the ground through the intermediary of a spring 40 and a wheel 41.

Figure 10:
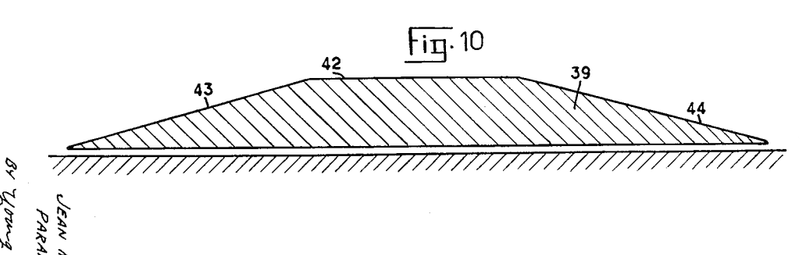
FIG. 10 is a diagrammatic view in cross-section, taken along the line X—X of FIG. 9.

The profile of this base 39 forms a kind of transverse beam having an upper horizontal portion 42 extended on each side by inclined portions 43 and 44 (see FIG. 10).

This base 39 thus forms a road for the vehicles which move along the edge of the ground to be consolidated; when a vehicle passes over the base 39, it flattens it against the ground by compression of the spring 40, so that it is only necessary to design the base 39 to withstand the load of the vehicles which pass over it.

In order to resist the lateral tractive forces, a compacting equipment according to the invention must furthermore have a good resistance to lateral skidding.

This can be effected by means of a wheel of the type used on railway rolling stock, such as shown at 46 in FIG. 9, if the road on the edge of the ground to be consolidated is provided with a rail 47.

Figure 11:
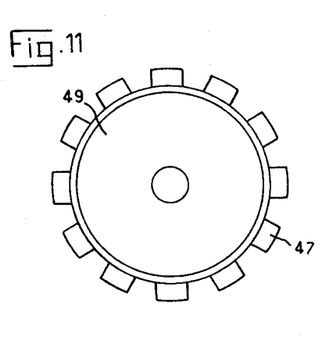
FIGS. 11 and 12 are views respectively in elevation and in profile of an anti-skid wheel provided on a machine according to the invention.
Figure 12:
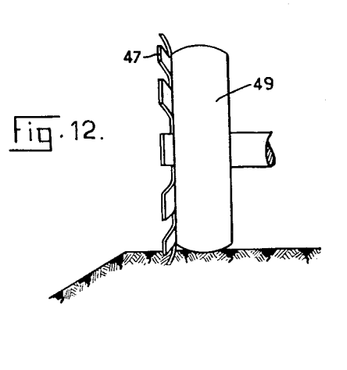

If this is not the case, fitted wheels 49 can be employed, which are provided with radial anchorage lugs 50, as shown in FIGS. 11 and 12.

Figure 13:
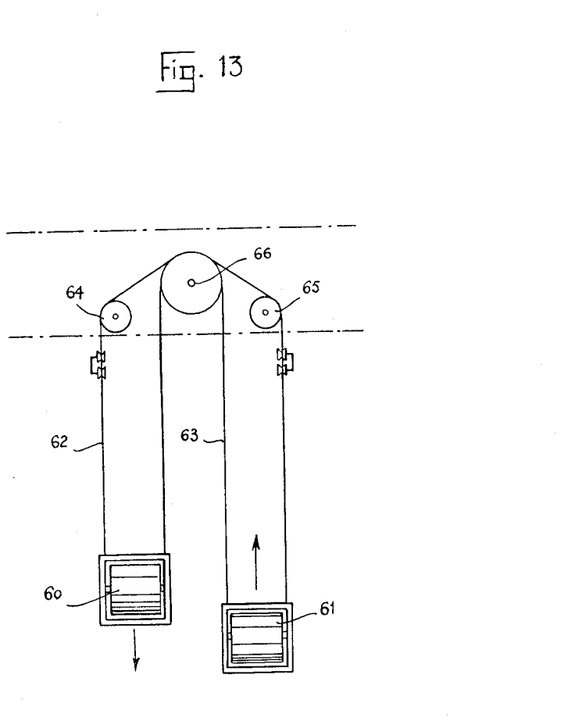
FIG. 13 is a diagrammatic view of a further alternative form of construction of equipment according to the invention.

In the alternative form of construction shown in FIG. 13, the compacting rollers 60 and 61 are driven by cables 62 and 63, each connected to two sides of the rollers 60 and 61, the cables passing over pulleys 64 and 65 and over a common pulley 66 of the double groove type.

Figure 14:
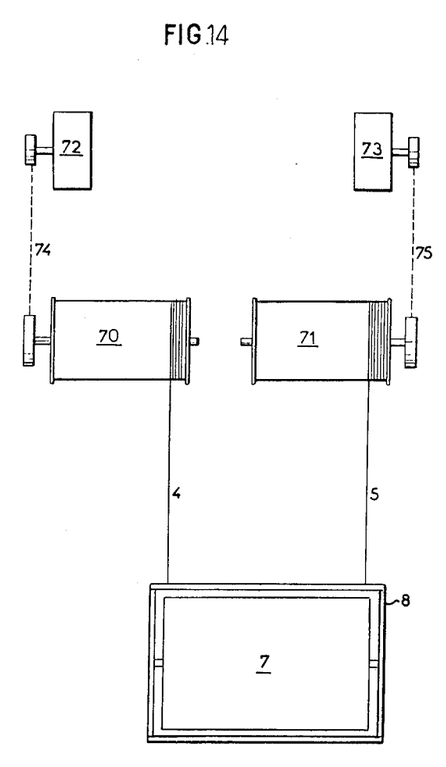
FIGS. 14 and 15 illustrate diagrammatically another form of construction of the compacting equipment according to the present invention, FIG. 15 showing in greater detail a control circuit for this equipment.
Figure 15:
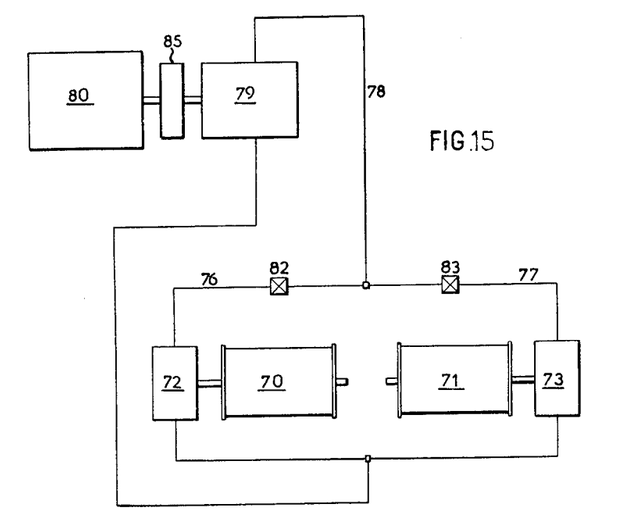

FIGS. 14 and 15 relate to an alternative form which utilizes other means for varying the free length of one of the cables with respect to that of the other cable. This alternative method involves equipment which is simpler than that previously described but which on the other hand also has a lower efficiency.

According to this alternative construction, a winding drum is associated with each of the cables fixed to the chassis of the roller, means being provided for varying the winding speeds of the two drums with respect to each other.

By this means it is possible to obtain at will the required relative variation of the free lengths of the two suspension cables of the roller.

As will be seen below, this arrangement which is preferably but not exclusively applied to the operation of a single roller, makes it possible to reduce the overall size of the equipment, which may then be mounted on a truck a trailer or other similar device and, in particular, on a self-propelled compacting roller mounted on pneumatic tires. In this latter case, it is possible to obtain a rolling device which can carry out at the same time consolidation work on substantially horizontal ground and also on steeply sloping ground. However, it is obvious that in this case the movement of other vehicles along the bank top on which the compacting machine is working may be impossible if the bank top is narrow.

The compacting equipment in the form of construction described and shown in FIGS. 14 and 15 comprises a roller 7 mounted in a chassis 8, on each side of which two cables 4 and 5 are fixed, one to each extremity. Each of these cables is associated with a winding drum 70 and 71 respectively, to which it is fixed by its other extremity. Each drum is coupled to a hydraulic motor 72 and 73 respectively through the intermediary of a chain 74 and 75 respectively.

A reduction gear may of course also be interposed between each hydraulic motor and the corresponding drum, or the motor may be mounted directly on the shaft of the drum, on the end of this shaft, or even in the interior of the drum.

The two motors 72 and 73 are connected in parallel by two conduits 76 and 77 to the circuit 78 of a pump 79 having a fixed or variable delivery and driven by a heat engine 80 which is for example the diesel engine of a mechanical roller on which the whole of the equipment is mounted.

In each of the conduits 76 and 77 which connect each hydraulic motor to the pump, is included a valve 82 and 83 respectively, operated by hand.

When the pump 79 is in service, the operation of one of the valves makes it possible for example to reduce the quantity of oil delivered to the corresponding motor; by this means, the flow-rate of oil increases in the second motor.

By operating the valves, it is thus possible to vary the speed of one of the hydraulic motors with respect to the other, which results in a higher winding speed of one of the cables than of the other. This produces a variation of the free length of one of the cables with respect to that of the other cable and the guiding of the roller on the slope is thereby ensured in the manner previously described.

The two valves 83 and 84 can be combined together in a double distributor with a single control handle in order to vary the flow-rate of oil of one motor with respect to the other. The operations are thereby simplified.

With regard to the reversal of the direction of working, this can be obtained by reversing the flow-rate of the pump 79 if this latter is chosen to be of the variable delivery type, or by the use of a reversing distributor mounted at the outlet of the pump and which may be combined with the steering distributor.

During the downward movement of the roller on the slope, the engine brake of the heat engine 80 which drives the pump 79 is employed. This engine brake being generally too weak, there is added to the heat engine a braking device 85, of any appropriate type, for example an electromagnetic braking device similar to those employed on heavy trucks in hilly country.

It may also be considered sufficient to brake the delivery of oil of the hydraulic motors; this solution is however less satisfactory, since it results in heating of the oil of the hydraulic circuit and also in difficulties of supply of oil to the hydraulic motors during the downward movement of the roller on the slope.

It will be noted that while retaining two separate drums for the suspension cables of the roller, it is possible to replace the hydraulic transmission described above by a transmission utilizing a different source of energy, for example electricity.

As has already been stated, in order to facilitate the winding of the cables, it is possible to impress on the drums a lateral movement which is synchronized with their movement of rotation.

In operation, the movement of the winch described above along the bank top is effected by the vehicle on which the winch is mounted; this movement may be effected, either in progressive steps or in a regular manner if the vehicle is provided with a very low geared transmission, permitting a very slow movement.

Figure 16:
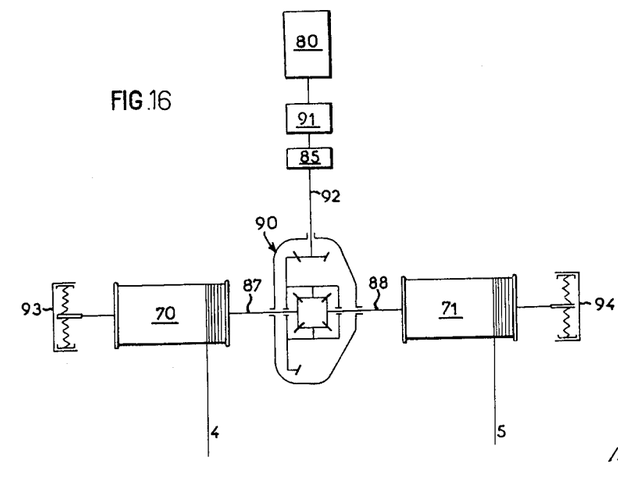
FIG. 16 illustrates diagrammatically a further alternative form of construction of the equipment according to the invention.

FIG. 16 illustrates very diagrammatically a further form of construction of the compacting equipment according to the invention, utilizing two winding drums, in which a mechanical differential gear is employed.

The winding drums 70 and 71, corresponding to the cables 4 and 5, are each mounted on a lateral output shaft 87 and 88 respectively, of a differential 90 of the usual type, the input shaft 92 of which is coupled to a driving motor 80. This motor may be a hydraulic motor supplied by a hydraulic pump with reversal of flow-rate as in the previous case, or an electric motor, or again a heat engine with a reversing reduction gear 91.

On each of the lateral shafts 87 and 88 is mounted a brake 93 and 94 respectively.

The relative variation of the free length of the cables 4 and 5 is obtained in this case also by relative variation of the speeds of winding of the drums 70 and 71, which is effected by means of the brakes 93 and 94.

Taking into account the large torques applied to the drums, it is preferable to employ a control of the assisted type for the brakes. This control may comprise separate controls for each brake, or may consist of a single control by which either of the drums can be braked as desired.

As in the case of the two hydraulic motors of the previous example, the slowing-down of one of the drums is accompanied by an increase in the speed of rotation of the other drum. The operator can therefore vary the free lengths of the cables 4 and 5 with respect to each other very easily, thus guiding the compacting roller as has already been described previously.

It will be noted that in order to facilitate the winding of the cables on the two half-winches, the drums may be given a movement of translation synchronized with the speed of rotation of the input shaft 92 of the differential.

It is also possible to couple each drum to a separate translation screw, the coupling between the differential and the drum being then effected by sliding shafts.

The displacement of the winch along the bank top is ensured by the vehicle which carries the winch.

As in the previous case, the engine brake is employed for the downward movement of the roller on the slope, but it is preferable and even necessary to provide a braking device 85 on the shaft 92.

The invention is of course not limited to the forms of embodiment described and shown, and includes all the alternative forms. In particular, all the improvements described can be utilized separately or in any combinations.

In the same way, the described means utilized on the device which moves along the sloping ground can be employed for operations other than consolidation; generally speaking, it is thus possible to ensure the control of hauled civil engineering equipment which lends itself to steering by means of the differential action of two haulage cables.

What I claim is:

1. Apparatus for the operation of compacting rollers and like devices working on sloping ground surfaces, for example on banks or embankments, of the kind comprising a machine intended to move along a road on the upper edge of the sloping ground surface to be consolidated, said machine comprising winch means mounted thereon and having at least one rotatable drum and adapted to give roller means comprising at least one compacting roller a to-and-fro movement over said sloping surface, said roller being mounted to a chassis, means for suspending said roller from said winch means, said suspending means comprising two parallel cables fixed one on each side of said chassis of said roller, and take-up means for varying at will the effective length of one of said cables normal to the drum with respect to the effective length of the other said cable normal to the drum.

2. Apparatus as claimed in claim 1, said roller means comprising at least one pair of compacting rollers each equipped with two cables, the two cables of one compacting roller wound on said winch means in the opposite direction to the direction of winding of the cables of the other compacting roller, one of said compacting rollers being in the upper position when the other associated compacting roller is in the lower position on the slope to be consolidated.

3. Apparatus as claimed in claim 1, in which axial thrust means are provided for imparting to the drum of said winch means an axial to-and-fro motion which is synchronized with the movement of rotation of said winch means.

4. Apparatus as claimed in claim 1, in which said take-up means for varying the effective length of a cable normal to the drum comprises a plate spaced from said drum and pivotally mounted on an axis fixed relative to said machine and parallel to the axis of said winch means, said plate comprising two rollers over which the cable passes, said plate having means to control its angular position.

5. Apparatus as claimed in claim 1, in which said means for varying the effective length of one of said cables normal to the drum comprises a pulley spaced from said drum and about which said cable passes, and actuating means adapted to displace said pulley at will.

6. Apparatus as claimed in claim 1, in which there are two rotatable drums each of which is associated with one of the two cables fixed to the chassis of a said compacting roller, and further comprising motorized means for varying the speeds of winding of the two drums, one with respect to the other.

7. Apparatus as claimed in claim 6, in which two hydraulic motors are supplied by parallel conduit means connected to a hydraulic pump coupled to a driving motor, each hydraulic motor being coupled to one of said rotatable drums, and said conduit means having flow-regulating means associated with said hydraulic motors, whereby the winding speeds of the said drums can be modified at will, one with respect to the other.

8. Apparatus as claimed in claim 6, in which said motorized means comprises a mechanical differential device having an input shaft coupled to a driving motor and having a pair of output shafts, each output shaft of said differential device having a brake thereon, whereby, when acting on either of said brakes, the binding speeds of the drums are varied, one with respect to the other.

9. Apparatus as claimed in claim 1, including a vehicle chassis, wheel means supporting opposite sides of said vehicle chassis, said winch means and a plurality of driving motors being grouped on one side of said vehicle chassis, and means defining a passageway for vehicular traffic between said wheel means.

10. Apparatus as claimed in claim 9, said passageway-defining means comprising a base member of low height and having inclined access ramps to permit vehicular traffic to pass over said base member.

11. Apparatus as claimed in claim 9, said passageway-defining means comprising a gantry interconnecting said wheel means on opposite sides of said vehicle chassis.

12. Apparatus as claimed in claim 11, and means pivotally interconnecting said gantry and said one side of the vehicle chassis for relative swinging movement about a vertical axis.

References Cited by the Examiner
UNITED STATES PATENTS

| | | | |
|---|---|---|---|
| 304,875 | 9/1884 | Viernon | 254—184 |
| 404,292 | 5/1889 | Lansell | 187—94 |
| 1,248,186 | 11/1917 | Smith | 254—184 |
| 1,311,108 | 7/1919 | Beckwith | 254—135 |
| 1,559,406 | 10/1925 | Carson | 61—63 |
| 1,626,879 | 5/1927 | Shidler | 94—50 |
| 2,170,330 | 8/1939 | Joedicke | 61—63 |
| 2,691,927 | 10/1954 | Denton | 94—50 X |
| 2,705,126 | 3/1955 | Addicks | 254—135 |

CHARLES E. O'CONNELL, *Primary Examiner.*

JACOB L. NACKENOFF, *Examiner.*

N. C. BYERS, *Assistant Examiner.*